United States Patent [19]
Hollabaugh

[11] 4,007,458
[45] Feb. 8, 1977

[54] DIGITAL TWO-WIRE IRRIGATION CONTROL SYSTEM

[75] Inventor: Michael D. Hollabaugh, San Jose, Calif.

[73] Assignee: Clemar Manufacturing Corporation, Azusa, Calif.

[22] Filed: Dec. 29, 1975

[21] Appl. No.: 644,617

[52] U.S. Cl. .................... 340/310 R; 340/310 A; 340/151
[51] Int. Cl.² ........................................ H04M 11/04
[58] Field of Search ....... 340/310 R, 310 A, 151 R; 307/40

[56] References Cited

UNITED STATES PATENTS

3,458,657 7/1969 Lester ............................ 340/310 A

Primary Examiner—Harold I. Pitts
Attorney, Agent, or Firm—Fulwider Patton Rieber Lee & Utecht

[57] ABSTRACT

Apparatus for the control of a number of remotely located irrigation or sprinkler valves from a central location by means of control signals encoded onto a single pair of power transmission lines linking a central encoder and a number of remote decoders. The encoder includes a multiplexer for selecting on/off signals supplied by a controller, an address generator to drive the multiplexer and to generate decoder addresses for transmission, and coupling circuitry to encode the generated decoder addresses and on/off signals onto an alternating-current power signal, by clipping half-portions of the signal to represent zero values. Each decoder includes a bridge rectifier, from which clock pulses and a serial data stream are derived. The data stream is continually shifted through a shift register, and a comparator compares a decoder address field in the register with the conditions of a set of manual switches indicative of the decoder address. When the comparator finds a match, the on/off signal is gated into a flip-flop and utilized to generate a valve control signal.

12 Claims, 6 Drawing Figures

DIGITAL TWO-WIRE IRRIGATION CONTROL SYSTEM

BACKGROUND OF THE INVENTION

This invention relates generally to irrigation control systems, and, more particularly, to digital systems for the control of a large number of irrigation or sprinkler valves in a desired sequence.

Large sprinkler systems, whether used to irrigate agricultural property, sports facilities, or other types of property, all include a large number of valves, which are typically solenoid-operated, and which must be opened and closed in a desired sequence of operations as determined by the terrain, climate and other factors. For very large systems, it is both costly and impractical to run a pair of wires from each of the valves to back to a central controlling device. Accordingly, it is a principal objective in designing such systems to reduce the number of conductors between the central controller and the valve locations to an absolute minimum, i.e., ideally to two wires. Inherently, this objective dictates the use of some form of control signal encoder at the central site and a control signal decoder at each valve location.

Control systems utilizing a central encoder and a number of remote decoders connected to the encoder by only two wires, or by one wire and a ground return, are not unknown. However, such systems have heretofore utilized a technique in which device addresses and control signals are encoded in the form of relatively high-frequency signal bursts, and are then decoded by appropriate filtering at each of the decoders. For example, U.S. Pat. No. 3,821,559, issued in the names of Ueda et al., discloses such a system for the digital control of a number of electrical devices in an automobile.

The present invention is concerned with improvements in a digital two-wire control system of which the basic principles have been disclosed in a publication by the inventor. In accordance with these principles, power is transmitted from a central controller and encoder to a number of decoders over two wires and in the form of an alternating current. Control information in the form of a decoder address and an on/off code is encoded into the alternating-current signal by selectively suppressing current flow in one direction to indicate binary values of the digits transmitted as control information. At each decoder, the control information is decoded, and the alternating-current signal is rectified to provide power to operate valves under the control of the decoded information.

In his originally published description of the basic invention, the inventor proposed that blocks of control information be separated by strings of all zeros, i.e., by cycles of the alternating-current signal in which one half of each cycle had been clipped to zero, and also proposed that the encoder and decoder logic be implemented using standard transistor-transistor logic (TTL). However, the use of strings of zeros to separate blocks of control information has the significant disadvantage that the power-carrying capacity of the lines from the encoder is substantially reduced. Furthermore, the use of TTL logic imposes the need for a highly stable power supply, and, more importantly, because of its relatively high power consumption, is not suitable for relatively large systems having many decoders and valves. It is to these particular problems that the improvements of the present invention are directed.

SUMMARY OF THE INVENTION

The present invention resides in a digital two-wire irrigation control system of the basic type described, in which a complete alternating-current waveform is used to separate blocks of control information, and in which the decoder utilizes complementary metal-oxide-semiconductor (CMOS) logic, to permit the use of a less stable power supply, and to substantially reduce decoder power consumption, thereby allowing the system to be used with relatively large irrigation systems with large numbers of valves. More specifically, the decoder of the present invention includes a bridge rectifier circuit to provide a power supply for operating the valve and the decoder logic, and for separating encoded data from the incoming power wave, a serial-input, parallel-output shift register into which a data stream from the incoming power wave is clocked by means of clock signals also generated from the incoming power wave, means for comparing decoder addresses in the shift register with address switches representative of the address of the particular decoder, and means for utilizing an on/off bit accompanying the decoder address if an address match is found by the comparing means, each of the digital logic elements in the decoder utilizing CMOS logic. Each block of control information received by the decoder comprises a decoder address field, an on/off bit, and two delimiting zeros, one preceding and one following the control information. Each block of control information or data is followed by a string of "ones", i.e., by a number of complete cycles of the alternating-current power wave, without clipping or other distortion. The field of the shift register in which the decoder address is expected to appear is continually compared with the contents of the address switches in the decoder, and the first and last stages of the shift register are simultaneously compared with zeros, to ensure that a correctly registered data block is being examined. When a match is found by the comparison, the on/off bit from the shift register is gated into a flip-flop, the output of which is used to switch power on or off to control a valve, or a number of valves connected together.

Ideally, and as in the illustrative embodiment, the encoder should also be implemented using CMOS logic. Basically, the encoder includes a multiplexer, a clock pulse generator, a digital counter, a parallel-input, serial-output shift register, and coupling circuitry for encoding the control information onto the alternating-current signal for transmission to the decoders. More specifically, the clock pulse generator is powered and synchronized by the alternating-current power supply, and supplies clock pulses to the digital counter which, in turn, drives the multiplexer, thereby scanning an array of on/off signals from a controller. Each on/off signal obtained through the multiplexer is gated into the shift register in parallel with the count from the counter, thus forming the decoder address field and the on/off bit. Periodically, a signal from the counter switches the shift register into its serial-output mode, and the data is shifted out of the register and encoded onto the alternating-current line by selectively suppressing half-cycles of the alternating-current signal on the line.

It will be appreciated from the foregoing that the present invention represents a significant improvement over the basic two-wire irrigation control system, in that it substantially reduces the power consumption requirements of decoders, and thereby allows the use of the invention in irrigation systems having large numbers of valves. Other aspects and advantages of the invention will become apparent from the following detailed description taken in conjunction with the accompanying drawings.

DESCRIPTION OF THE PREFERRED EMBODIMENT

Figure 1:
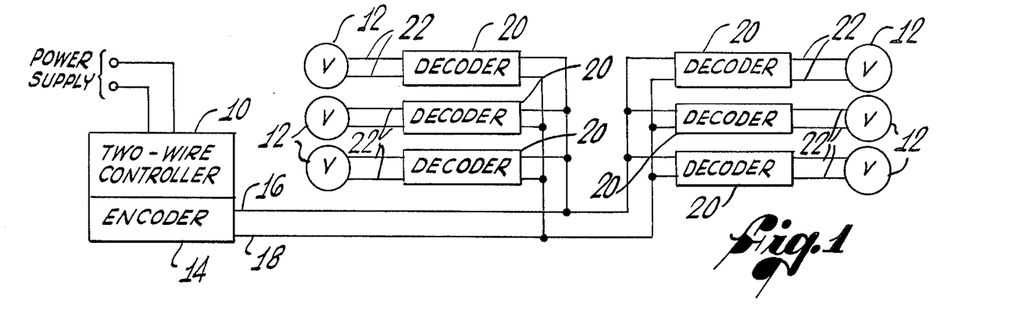
FIG. 1 is a block diagram of a two-wire irrigation control system of the type in which the present invention may be employed.

As shown in the drawings for purposes of illustration, the present invention relates to improvements in a digital two-wire irrigation control system of the type illustrated in FIG. 1. Basically, this irrigation control system includes a controller, indicated by reference numeral 10, for generating on/off signals for a number of valves 12 in the system in a desired and usually controllable sequence, an encoder 14 for encoding the on/off signals onto two power distribution lines 16 and 18 connecting the encoder to each of a plurality of decoders 20 in the system, the decoders then being connected by pairs of wires 22 to the valves. It will be appreciated, of course, that there may be more decoders 20 than the six illustrated in FIG. 1, and that there may be more than one valve 12 controlled by each decoder.

Figure 2:
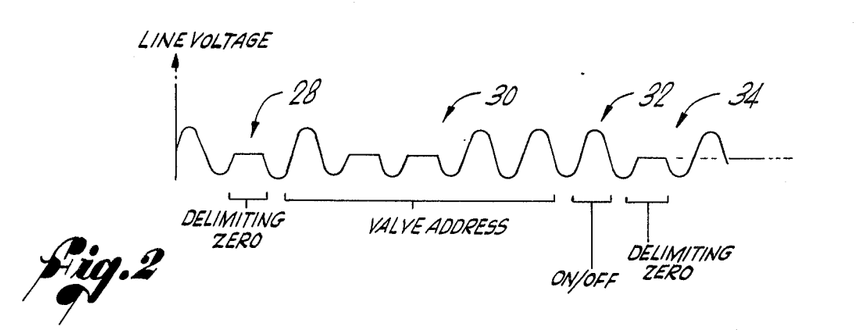
FIG. 2 shows a typical portion of a line voltage waveform as it is used to encode control information in the system of FIG. 1.

In the present invention, control information, in the form of decoder addresses and on/off signals are encoded onto the power signal transmitted along the lines 16 and 18 between the encoder 14 and the decoders 20. As shown in FIG. 2, the information is encoded digitally by clipping the upper or positive half of the usually sinusoidal power waves when a zero is to be encoded, and not clipping the upper halves when a "one" is to be encoded. Each block of control information, including a decoder address and an of/off signal, is delimited by zero bits at its beginning and end, to facilitate decoding at the receiving end. Thus, as in the illustration in FIG. 2, each block of control information begins with a delimiting zero, as shown at 28, then includes a five-bit decoder address 30, 10011 in the example illustrated, followed by a one-bit on/off signal 32, 1 or on in the example, and ends with another delimiting zero 34.

Figure 3:
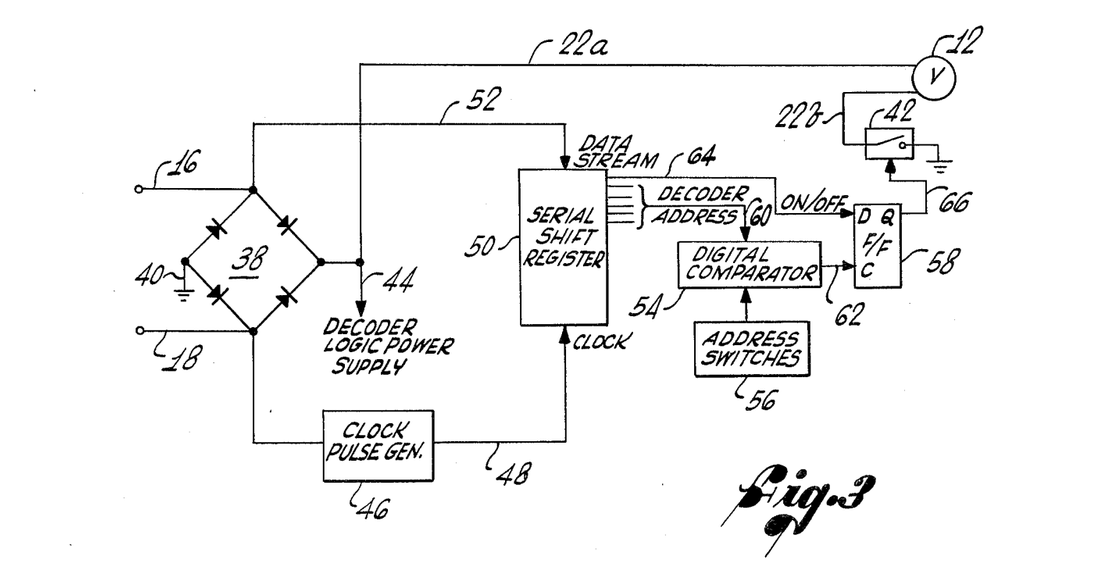
FIG. 3 is a simplified schematic diagram of the decoder of the present invention.

As shown in the simplified schematic of FIG. 3, the lines 16 and 18 from the encoder 14 are connected to a bridge rectifier 38 which is here utilized both as a full-wave rectifier and as a phase-splitting device. The full-wave rectified output from the bridge rectifier 38 is connected by line 22a to the valve 12, the other output terminal of the rectifier being grounded, as shown at 40. The other line 22b from the valve 12 is connected through a switch 42 to ground, and the remainder of the decoder logic operates to open or close the switch and thereby to open or close the valve. Power supply for the decoder logic is also derived from the bridge rectifier 38, as shown at 44.

It will be appreciated from fundamental rectifier theory that the voltage at the rectifier input to which the first power line 16, which will be referred to as the hot line, is connected will have a waveform showing only the upper or positive halves of the complete power wave, if there are any upper halves present. Similarly, the voltage at the rectifier input to which the other power line 18, to be referred to as the common line, is connected will have a waveform showing only the lower halves of the incoming voltage waveform. Basically, the lower halves of the voltage wave are utilized to generate clock pulses in a clock pulse generator 46, which is connected by line 48 to the clock terminal of a serial-input, parallel-output shift register 50, the data input of which is obtained over line 52 from the hot line input terminal of the rectifier 38. The clock pulse generator 46 generates a conventional square-wave clock pulse from the semi-sinusoidal waveform derived from the common line input to the bridge rectifier 38. The data stream on the power lines 16 and 18 to the decoder 20 is therefore continuously shifted through the shift register 50 at the power supply frequency.

The remainder of the decoder logic comprises a digital comparator 54, a set of address switches 56, and a flip-flop 58. The digital comparator 54 receives over lines 60 five bits of data corresponding to the decoder address field of the shift register 50, and is also connected to check for a zero content in the first and last stages of the shift register. Consequently, the digital comparator 54, which is supplied with address switch settings from the address switches 56, generates an output, on line 62, only when the first and last stages of the shift register 50 are zero, and when the transmitted decoder address corresponds with the settings of the address switches 56. The digital comparator output on line 62 is connected to the clock input of the flip-flop 58, and the on/off bit from the shift register 50 is connected over line 64 to the D input of the flip-flop. Accordingly, when the digital comparator 54 finds a match, meaning that the control information is intended for this particular decoder, the on/off bit is gated into the flip-flop 58, and the Q output of the flip-flop assumes a value equivalent to the intended on/off condition. The Q output of the flip-flop 58 is connected as shown by line 66 to the switch 42, so that the valve 12 is switched in accordance with the transmitted on/off information. Moreover, the flip-flop 58 acts as a one-bit memory cell to store the value of the current on/off condition of the valve 12, so that if the valve should be switched to the wrong condition by some extraneous electrical or mechanical force, the effect of the flip-flop 58 will be to switch the valve immediately to its correct condition again.

Figure 4:
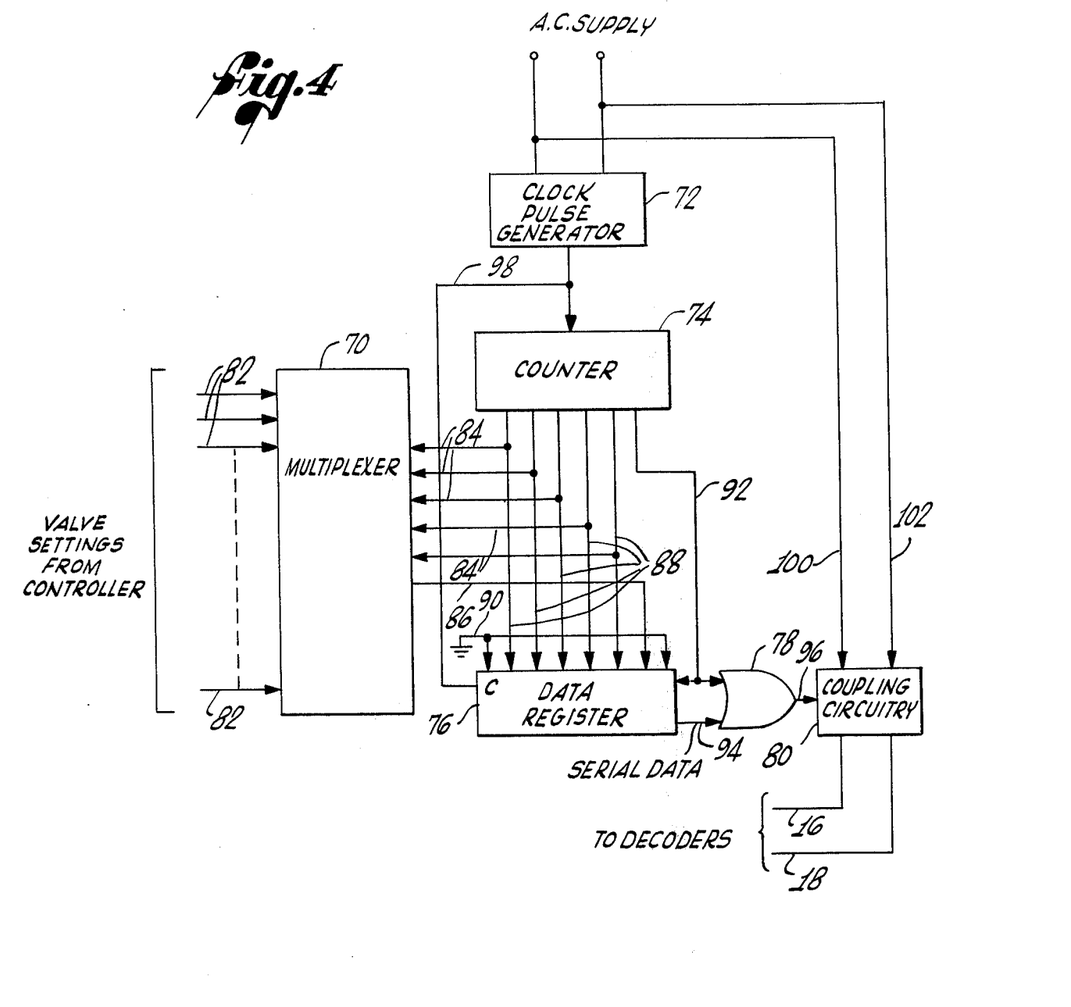
FIG. 4 is a simplified schematic diagram of the encoder of the present invention.

The basic encoder circuit is shown in simplified form in FIG. 4. It comprises a multiplexer 70, a clock pulse generator 72, a digital counter 74, a parallel-input, serial-output shift register 76, an OR gate 78, and coupling circuitry 80 for encoding the control information onto the lines 16 and 18 to the decoders. The multiplexer 70 receives on/off signals on lines 82 from the controller 10, which generates a programmed sequence of on/off signals in accordance with system requirements. Thus, at any instant, the signals on lines 82 represent the on/off conditions of all of the valves in the irrigation system. The multiplexer 70 is driven by addressing signals on lines 84 from the digital counter 74, such that, as the counter is incremented in value, the multiplexer selects each of the inputs on lines 82 in turn, and connects it to an output line 86 for transmission to one stage of the shift register 76. The count in the counter 74 is also transmitted by lines 88 to five other stages of the shift register 76, so that, at any instant, the register contains a decoder address, and its corresponding desired on/off condition. The two outermost parallel inputs to the shift register 76 are forced to a zero condition, as shown at 90, to form the delimiting zero bits for a block of control information. The digital counter 74 is driven by clock signals transmitted from the clock pulse generator 72, and derived from the alternating-current supply frequency in such a manner that the count on lines 84 and 88 from the counter 74 is incremented once for some multiple number of power-line cycles, in this case once for every sixteen cycles.

Also derived from the counter 74 is a one-bit signal utilized to control unloading operations on the shift register 76, as shown by line 92. In effect, the condition of the signal on line 92 determines whether the shift register 76 operates in a parallel-input mode or a serial-output mode. Serial data from the shift register 76 is output over line 94 to one input of the OR gate 78, the other input being obtained from line 92 from the counter 74. Thus, it will be seen that when the signal on line 92 from the counter 74 is a one, a continuous stream of ones is transmitted through the OR gate 78, and thence through output line 96 to the coupling circuitry 80. When the signal on line 92 from the counter 74 changes to a zero state, the shift register 76 is switched to its serial output mode, and the contents of the register, including the zero delimiting bits, the address field, and the on/off bit, are gated out through the OR gate 78 to the coupling circuitry 80. The clocking signal for this serial output from the shift register 76 is also derived from the clock pulse generator 72, as shown by line 98. It will be seen that the effect of the aforedescribed circuitry is to transmit eight-bit blocks of control information separated by eight-bit strings of all ones.

The coupling circuitry 80 utilizes the serial information input on line 96 from the OR gate 78, and appropriately clips the upper halves of the alternating-current supply voltage received over lines 100 and 102, for transmission over lines 16 and 18 to the decoders. The coupling circuitry 80 will be described more fully with reference to FIG. 6.

Figure 5:
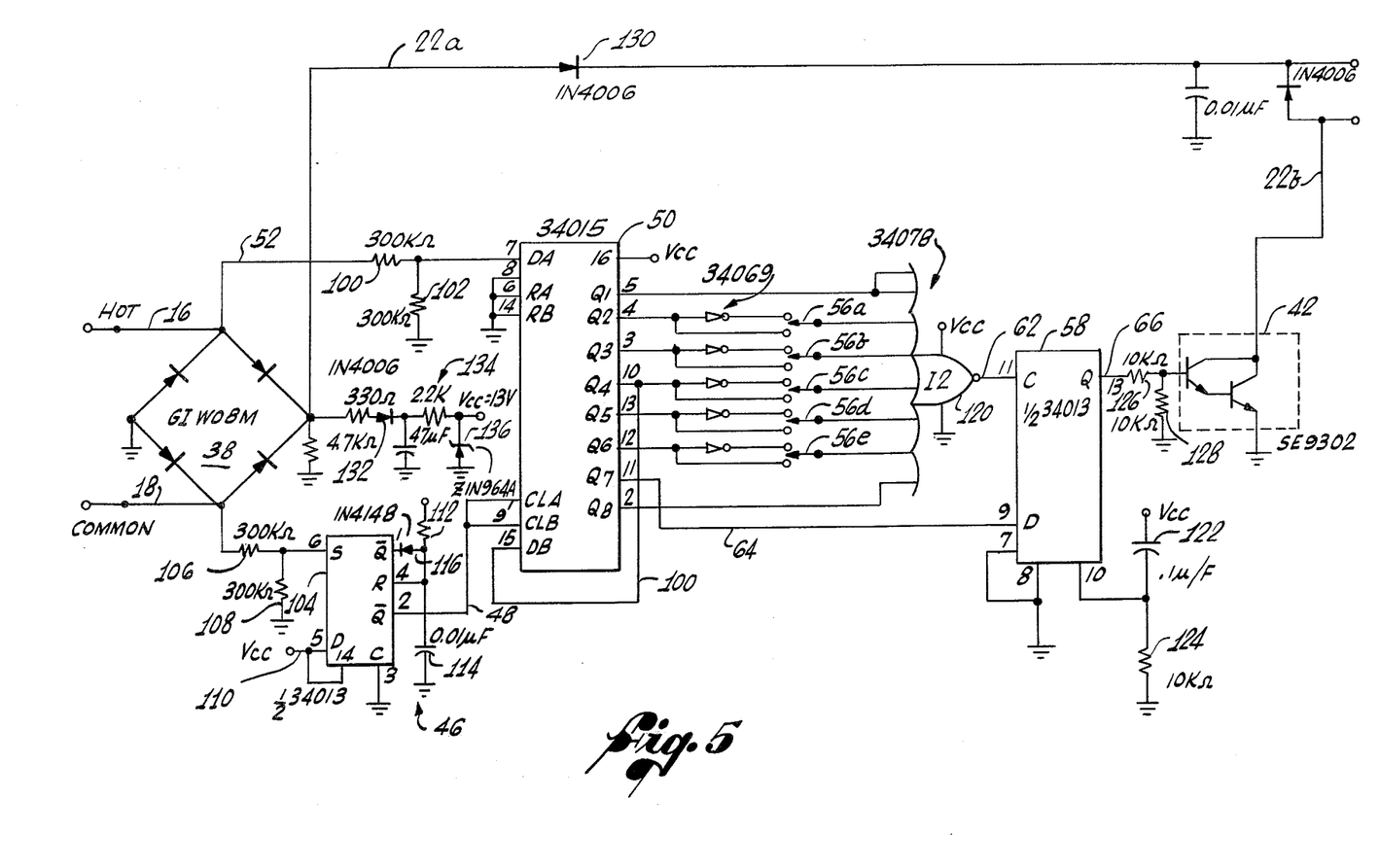
FIG. 5 is a detailed schematic diagram of the decoder.

As FIG. 5 shows in detail, the shift register 50 of the decoder consists of a dual four-bit static shift register connected to form an eight-bit shift register, as shown by line 100 from the Q4 output of the first half of the register to the D input of the second half of the register. Line 52 from the hot line 16 input terminal of the bridge rectifier 38 is connected through a series resistor 100 to the D input of the first half of the shift register 50, there being a second resistor 102, forming a voltage divider with the first, connected between the D terminal of the first half of the register and ground. As explained with reference to FIG. 3, the signal applied to the D terminal of the first half of the shift register 50 will consist of the positive-going halves of the power wave received on lines 16 and 18 which, as has also been explained, make up the encoded data stream transmitted down the lines.

Clock signals for the shift register 50 are generated by the clock pulse generator 46, which includes a D flip-flop 104 and associated circuitry to be described. Connection from the common line 18 input terminal of the bridge rectifier 18 is made to the set terminal of the flip-flop 104 through a series resistor 106, there being a second resistor 108 connected from the set terminal to ground to form a voltage divider. Thus, the flip-flop 104 will be placed in the set condition by each negative-going half of the original power wave on the lines 16 and 18 from the encoder 14 (FIG. 1). The D terminal of the flip-flop 104 is held permanently in a high condition by application of power supply voltage, as shown at 110. The reset terminal of the flip-flop 104 is connected to the power supply through a resistor 112, is connected to ground through a capacitor 114, and is also connected to the Q output of the flip-flop through a diode 116, the anode of which is connected to the reset terminal. It will be apparent that, when the flip-flop 104 is in a set condition, the Q output will be high, and consequently no current can flow through the diode 116. The capacitor 114 will then be charged from the power supply through the resistor 112, and the voltage at the reset terminal will rise until it reaches a value sufficient to reset the flip-flop. After the flip-flop 104 has been reset, the diode 116 will be in a conductive state effectively short-circuiting the capacitor 114 until the flip-flop is again set by the next negative-going half of the power wave on lines 16 and 18. The clock inputs of the shift register 50 are supplied on line 48 from the Q output of the flip-flop 104, which, it can be seen, will be a square-wave output having the same frequency as the power signal transmitted from the encoder 10 (FIG. 1).

The effect of the decoder circuitry described thusfar is to shift the data stream continually through the stages of the shift register 50, its outputs Q1–Q8 representing the last eight bits of encoded information received from the encoder 10 (FIG. 1). The address switches 56 are five single-pole, double-throw switches 56a–56e, each having an output terminal and two alternate input terminals to which the output terminal may be connected by changing the position of the switch. The outputs Q2–Q6 of the shift register 50, comprising the decoder address field, are connected directly to one set of input terminals of the switches 56a–56e, and are also connected through inverters 118 to the other set of input terminals of the switches. Thus, the switches 56a–56e allow the selection of either the inputs Q2–Q6 or their inverse values. The output terminals of the switches 56a–56e are connected as inputs to a NOR gate 120, the output of which is connected over line 62 to the clock input of flip-flop 58, which is another D flip-flop. The Q1 and Q8 outputs of the shift register 50 are also connected directly as inputs to the NOR gate 120, and the Q7 output of the shift register, i.e., the on/off bit, is connected by line 64 to the D input of flip-flop 58.

It will be apparent that, if the address present at any instant in the output stages Q2–Q6 of the shift register 50 corresponds exactly with the settings of the switches 56a–56e, and if the first and last stages Q1 and Q8 are zero, then all of the inputs to the NOR gate 120 will be zero, and its output will consequently be a logical one. The effect of a one output from the NOR gate 120 is to set the flip-flop 58 to the value impressed on its D terminal, i,e., the on/off value on line 64 from the shift register 50. A reset signal is applied to the flip-flop 58 from the junction of a capacitor 122 and a resistor 124 connected in series between the power supply and ground, to ensure that the flip-flop is in a reset condition when power is initially applied to the decoder. The Q output from the flip-flop 58 is connected through a voltage divider, consisting of resistors 126 and 128, to the current switch 42, which consists of two NPN transistors connected as a Darlington pair. The current switch 42 completes a circuit between one terminal of the valve solenoid and ground, through line 22b, thus effecting switching of the valve between its on and off conditions.

The full-wave rectified voltage from the bridge rectifier 38 is connected by line 22a through a diode 130 to the other terminal of the valve solenoid. The power supply for the decoder logic is also derived from the bridge rectifier 38 by means of an additional diode 132, an R-C filter network 134, and a voltage-regulating zener diode 136. The digital logic elements employed for the flip-flops 58 and 104, shift register 50, and NOR gate 120 is CMOS logic of the 4000 series, well known in the logic design art. For example, the shift register 50 could be the part number 34015, the flip-flops 58 and 104 part number 34013, the NOR gate part number 34078, and the inverters part number 34069, all of the 34000 isoplanar CMOS series manufactured by the Semiconductor Component Group of Fairchild Camera Instrument Corporation, Mountain View, California. Use of this logic results in a reduction in power consumption by a factor of at least 100 over standard TTL logic.

Figure 6:
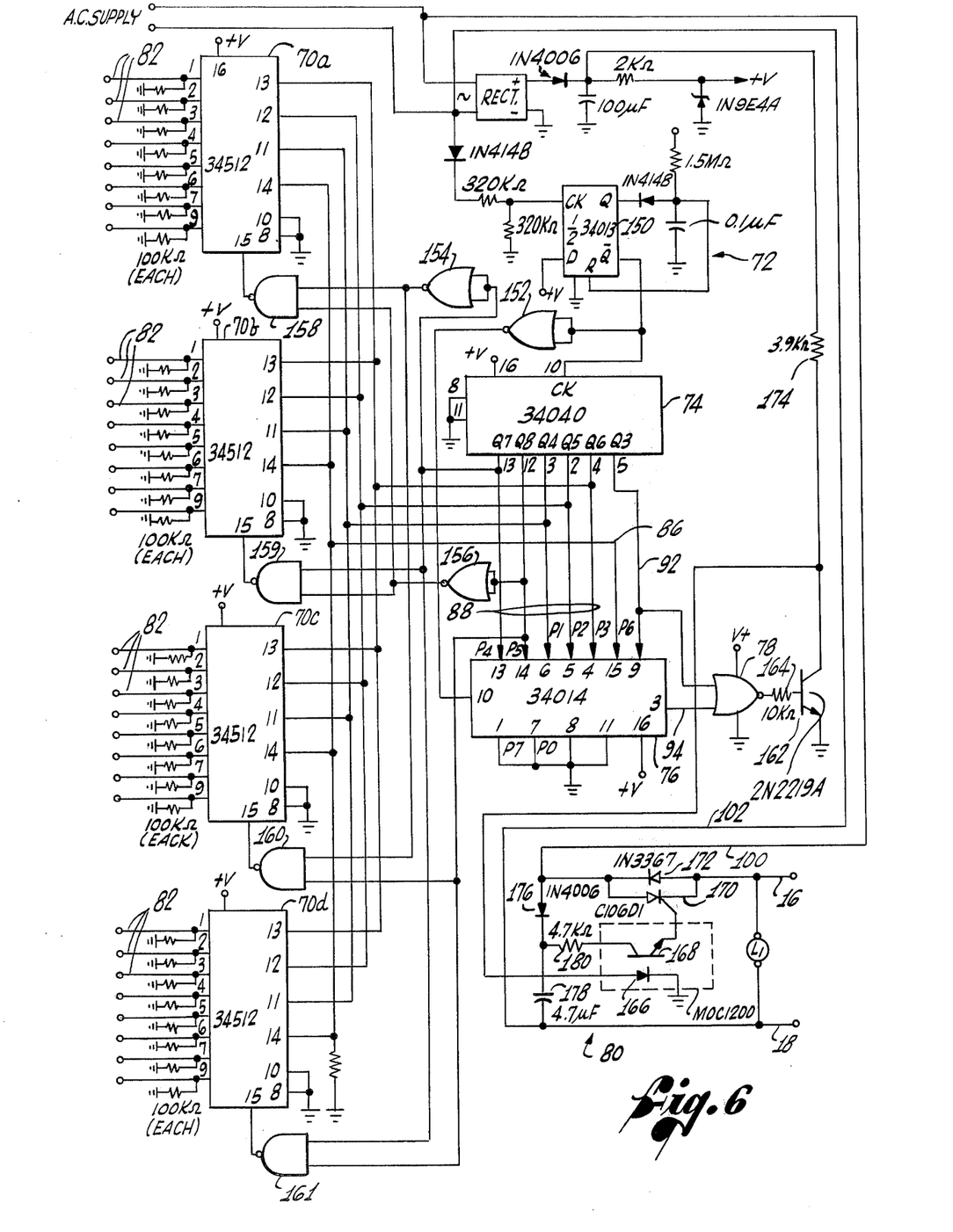
FIG. 6 is a detailed schematic diagram of the encoder.

As shown in FIG. 6, the encoder multiplexer 70 actually includes four multiplexer modules 70a–70d, each having eight inputs 82, for a total of 32 possible inputs. The clock pulse generator 72 utilizes a D flip-flop 150 and associated circuitry which is substantially the same as that employed in the decoder clock pulse generator 46 (FIG. 3) which was described with reference to FIG. 5. Accordingly, clock pulses are supplied to the counter 74 at the frequency of the power supply. The clock pulses are also transmitted over line 98 and through a NOR gate 152 connected as an inverter, to the shift register 76. The counter 74 is multiple-stage binary counter of which only outputs Q3–Q8 are utilized in this circuit. It will be seen that outputs Q4–Q6 are connected in parallel to the select inputs S0, S1 and S2 of each of the multiplexer modules 70a–70d, and are also connected to three of the parallel inputs, P1–P3, respectively, of the shift register 76. The next two higher stages of output of the counter 74, i.e., Q7 and Q8, are used to determine which of the multiplexer modules 70a–70d will be enabled at any particular time. This latter function is effected by means of two NOR gates 154 and 156 connected as inverters, for obtaining the inverse values of Q8 and Q9, and four NAND gates 158–161 connected to the input enable terminals of the respective multiplexer modules 70a–70d. Elementary analysis of this logic will show that, when Q7 and Q8 are both in a zero condition, only the first multiplexer module 70a will be enabled. When Q7 is in a one condition and Q8 is in a zero condition, the second module 70b is enabled, and so on. The output signals from each of the multiplexer modules 70a–70d are connected by a common line 86 to one of the parallel inputs, P6, of the shift register 76, so that the P6 input will be indicative of the on/off condition of the multiplexer input selected by the count indicated output Q4–Q8 of the counter 74. The outputs Q7 and Q8 of the counter 74 are also connected to the parallel inputs P4 and P5, respectively, of the shift register 76, so that inputs P1–P5 contain the decoder address represented by Q4–Q8.

It will be apparent that the least significant bit of the count indicated by Q4–Q8 of the counter 74 will change state every sixteen counts of the clock input to the counter, i.e., every sixteen power cycles. The Q3 output of the clock 74 will change state every eight cycles, and this output is utilized to select the parallel-input or serial-output mode of operation of the shift register 76. When Q3 is in a one condition, the shift register 76 is enabled to input parallel information on parallel inputs P1–P6, as well as on inputs P0 and P7, which are permanently connected to ground to provide a zero input. Simultaneously, while the Q3 output is in the one condition, it is utilized to transmit ones through NOR gate 78 to the coupling circuitry 80 to be described herein. When Q3 changes to a zero state, the shift register 76 is switched to serial-output operation and its contents previously input on the parallel inputs P0–P7 are output over line 94 to the NOR gate 78 and thence to the coupling logic 80.

Basically, the coupling logic 80 includes an NPN transistor 162 to which the NOR gate is coupled by means of a resistor 164 connected from the NOR gate output to the base of the transistor, a light-emitting diode (LED) 166 and a phototransistor 168 in combination, a silicon controlled rectifier (SCR) 170, and a diode 172. The collector terminal of the transistor 162 is connected through a resistor 174 to the rectified power supply, and the LED 166 is connected between the collector terminal and ground. Consequently, so long as the transistor 162 is in a conductive state, the LED 166 is effectively short-circuited and is not energized. However, as soon as the transistor 162 is turned off, the LED 166 is energized, and the phototransistor 168 is thereby rendered conductive.

Connected across the alternating-current power supply lines 100 and 102 are a diode 176 and a capacitor 178 in series, and the collector terminal of the phototransistor 168 is connected to the junction of this diode and capacitor through a resistor 180. The emitter terminal of the phototransistor 168 is connected to the gate terminal of the SCR 170, which is connected back-to-back with the diode 172, i.e., the anode and cathode of the diode are connected respectively to the cathode and anode of the SCR. The diode 172 is connected in series with one of the power lines 16, so that when the SCR 170 is conductive, the diode and SCR together allow conduction of current in either direction. However, when the SCR 170 is non-conductive, the diode 172 allows conduction in only one direction, and conduction in the so-called positive direction is prevented, thereby clipping the positive half of the waveform. Since this clipping process depends on current flow, a load 182 is provided across the lines 16 and 18 to the decoders.

It can be seen that the presence of a one input to the NOR gate 78 will render the transistor 162 non-conductive, which will energize the LED 166, which, in turn, will render the SCR 170 conductive, thereby allowing current to pass along the power line 16 in both the positive and negative directions. Current flowing in the negative direction, i.e., through the diode 172, will render the SCR 170 non-conductive again, and the presence of a one at an input to the NOR gate 78 will again be required to ensure that current is conducted in the positive direction through the SCR. Clearly, this has the desired effect of clipping the positive half of the power wave when a zero is intended to be encoded, and not clipping the wave when a one is intended to be encoded.

As in the detailed circuitry of the decoder, CMOS logic of the 4000 series is again employed in the encoder, and, in the presently preferred embodiment, part number 34512 is employed for the multiplexer modules 70a–70d, part number 34040 is employed for the counter 74, and part number 34014 is employed for the shift register 76, all part numbers being of the 34000 isoplanar CMOS series manufactured by the Semiconductor Components Group of Fairchild Camera and Instrument Corporation, Mounatin View, California. The other digital logic elements in the encoder also may utilize logic selected from this series, and the other part numbers given in the drawings are well known in the semiconductor industry.

It will be appreciated from the foregoing that the present invention represents a significant advance in the field of digital control systems using only two wires for the control of valves in large irrigation systems. In particular, the use of CMOS logic and the transmission of a complete and undistorted power wave between blocks of information, permit the use of the invention in the control of large numbers of valves in irrigation systems. It will also be appreciated that, although a specific embodiment of the invention has been described and illustrated in detail, various modifications may be made without departing from the spirit and scope of the invention. Accordingly, the invention is not to be limited except as by the appended claims.

I claim:

1. Decoding apparatus for use in an irrigation control system in which both power and control signals are transmitted from a central location along a single pair of conductors, said apparatus comprising:
    rectifier means for generating a direct-current signal from a basically sinusoidal received power signal, and for dividing the power signal into a first signal reflecting power signal excursions only in one direction with respect to a zero reference, and a second signal reflecting power signal excursions only in the other direction, the presence of excursions of said first signal being indicative of encoded ones;
    electronic switch means for connecting the direct-current signal from said rectifier means to at least one valve solenoid;
    means for identifying said decoding apparatus; and
    digital logic means utilizing complementary metal-oxide-semiconductor logic for deriving sets of control signals and decoder addresses from said first signal, and for operating said electronic switch means in accordance with those of said control signals accompanied by a decoder address equivalent to said means for identifying said decoding apparatus.

2. Decoding apparatus as set forth in claim 1, wherein said digital logic means includes:
    clock pulse generation means for deriving a clock signal from said second signal;
    shift register means clocked by said clocking signal, receiving said first signal as a serial input, and having a decoder address field, a control field, and leading and trailing delimiting fields;
    digital comparator means for comparing said delimiting fields with zero to ensure proper registration of data in said shift register means, and for comparing said decoder address field with said means for identifying said decoding apparatus; and
    electronic means for coupling said digital comparator means and said control field of said shift register means with said electronic switch means, to operate said electronic switch means in accordance with said control field when said digital comparator means finds a match;
    whereby said first signal is encoded with blocks of control information delimited by zero leading and trailing fields and separated by strings of encoded ones, for minimum distortion of the power signal.

3. Decoding apparatus as set forth in claim 2, wherein said means for identifying said decoding apparatus includes a plurality of manually operable address selection switches.

4. Decoding apparatus as set forth in claim 2, wherein said electronic means includes a flip-flop for storing the most recently received and decoded contents of said control field, whereby said flip-flop ensures that the valve solenoid remains in a desired condition until a new control field is received and decoded.

5. Encoding apparatus for use in an irrigation control system having a plurality of encoders connected to said encoding apparatus by a single pair of conductors, said apparatus comprising:
    digital logic means utilizing complementary metal-oxide-semiconductor logic, including
        multiplexer means for selecting for output one of a plurality of on/off signals supplied by a controller,
        clock pulse generation means for deriving clock signals from an alternating-current supply,
        digital counting means for generating decoder addresses to drive said multiplexer means,
        register means coupled with said counting means and with the output of said multiplexer means, for holding successive blocks of control information, each block comprising a decoder address, an on/off signal, and leading and trailing delimiting zeros, and
        gating means actuated by said counting means and said clock pulse generation means, for serially gating successive blocks of control information from said register means; and
    coupling circuit means connected with said gating means, for selectively suppressing current flow in one direction through one of the conductors from said encoding apparatus, in accordance with the contents of the successive blocks of control information from said gating means.

6. Encoding apparatus as set forth in claim 5, wherein said gating means includes means for gating a string of binary "ones" to said coupling circuit means following each block of control information.

7. Encoding apparatus as set forth in claim 5, wherein said coupling circuit means includes:
    a diode connected in series with said one of the conductors to permit current flow in one direction; and
    a silicon controlled rectifier connected across said diode to permit current flow in the opposite direction only when said silicon controlled rectifier is rendered conductive by a gating signal generated when a binary "one" is gated to said coupling circuit means.

8. A digital two-wire irrigation control system, comprising:

an encoder, including
- decoder address generation means,
- means for selecting on/off signals for transmission with decoder addresses, and
- means for encoding decoder addresses and on/off control signals onto an alternating-current power signal by selectively suppressing excursions of the power signal in one direction;

a pair of conductors for transmission of the power signal, encoded with decoder addresses and on/off control signals, from said encoder; and at least one decoder connected to said pair of conductors and including
- rectifier means for generating a direct-current signal from the power signal, and for generating a data stream derived from excursions of the power signal in the one direction,
- electronic switch means for connecting the direct-current signal from said rectifier means to at least one valve solenoid,
- means for identifying said decoder, and
- digital logic means utilizing complementary metal-oxide-semiconductor logic for deriving the encoded decoder addresses and control signals from said data stream, and for operating said electronic switch means in accordance with those of said control signals accompanied by a decoder address equivalent to said means for identifying said decoder.

9. A digital two-wire irrigation control system as set forth in claim 8, wherein said digital logic means includes:

clock pulse generation means for deriving a clock signal from the power signal;

shift register means clocked by said clocking signal, receiving said data stream as serial input, and having a decoder address field, a control field, and leading and trailing delimiting fields;

digital comparator means for comparing said delimiting fields with zero to ensure proper registration of said decoder address and control fields, and for comparing said decoder address field with said means for identifying said decoder; and electronic means for coupling said digital comparator means and said control field of said register means with said electronic switch means, to operate said electronic switch means in accordance with said control field when said digital comparator means finds an address match.

10. A digital two-wire irrigation control system as set forth in claim 9, wherein said means for identifying said decoder includes a plurality of manually adjustable address selection switches.

11. A digital two-wire irrigation control system as set forth in claim 9, wherein said electronic means includes a flip-flop for storing the most recently received and decoded contents of said control field, whereby said flip-flop ensures that the valve solenoid remains in a desired condition until a new control field is received and decoded.

12. A digital two-wire irrigation control system as set forth in claim 8, wherein, in said encoder:

said decoder address generation means includes clock pulse generation means synchronized with the power signal, and digital counter means;

said means for selecting on/off signals includes a multiplexer whose address selection is controlled by the contents of said digital counter means; and said means for encoding decoder addresses and on/off signals includes
- register means coupled with said digital counter means and with the output of said multiplexer, for holding successive blocks of control information, each block comprising a decoder address, an on/off signal, and leading and trailing delimiting zeros,
- gating means actuated by said digital counter means and said clock pulse generation means, for serially gating successive blocks of control information from said register means, and
- coupling circuit means connected with said gating means, for selectively suppressing current flow in one direction in one of said conductors in accordance with the contents of the successive blocks of control information from said gating means.

* * * * *

UNITED STATES PATENT AND TRADEMARK OFFICE
CERTIFICATE OF CORRECTION

PATENT NO. : 4,007,458

DATED : February 8, 1977

INVENTOR(S) : Richard L. Ruggles

It is certified that error appears in the above-identified patent and that said Letters Patent are hereby corrected as shown below:

Column 1, line 17, delete "to" (second occurrence).

Column 2, line 28, "Each block" should start a new paragraph.

Column 3, line 53, "of/off" should be --on/off--.

Column 9, line 16, "Mounatin" should be --Mountain--;

Line 48, "ones" should be --"ones"--.

Signed and Sealed this

Third Day of May 1977

[SEAL]

Attest:

RUTH C. MASON
*Attesting Officer*

C. MARSHALL DANN
*Commissioner of Patents and Trademarks*